W. ADRIANCE.
CLUTCH SHAFT-GEARING.

No. 188,562.            Patented March 20, 1877.

Witnesses.
Otto Hufeland.
Chas. Wahlers.

Inventor.
Walter Adriance
by
Van Santvoord & Hauff
his attorneys.

UNITED STATES PATENT OFFICE.

WALTER ADRIANCE, OF POUGHKEEPSIE, NEW YORK.

IMPROVEMENT IN CLUTCH SHAFT-GEARING.

Specification forming part of Letters Patent No. 188,562, dated March 20, 1877; application filed March 1, 1877.

*To all whom it may concern:*

Be it known that I, WALTER ADRIANCE, of Poughkeepsie, in the county of Dutchess and State of New York, have invented a new and Improved Device for Transmitting Motion, which invention is fully set forth in the following specification, reference being had to the accompanying drawing, in which—

Figure 1:
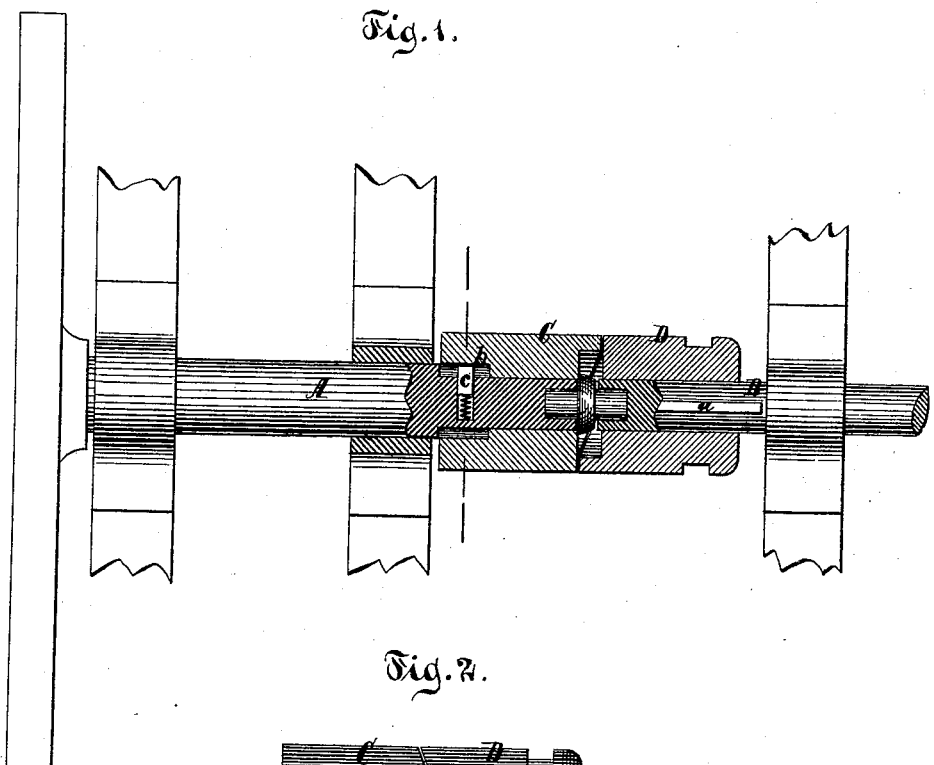
Figure 2:
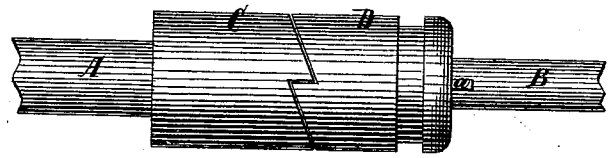
Figure 3:
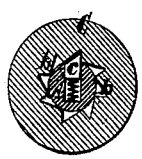

Figure 1 represents a longitudinal section. Fig. 2 is a side elevation. Fig. 3 is a transverse section.

Similar letters indicate corresponding parts.

This invention consists in the combination with two shafts—one of which may be termed the driving-shaft and the other the driven shaft, with a sliding clutch mounted on the driven shaft, and with a stationary clutch mounted on the driving-shaft—of ratchet-teeth formed in the interior of the stationary clutch, and of a spring-pawl fitted in a socket formed in the driving-shaft, so that, if the two clutches are thrown in gear and the driving-shaft is rotated in the right direction, the motion is transmitted to the driven shaft; but if the driving-shaft is turned in the wrong direction the driven shaft remains stationary.

In the drawing, the letter A designates the driving-shaft, from which motion is to be transmitted to the driven shaft B, both these shafts being situated in a right line, but so arranged that each can revolve independent of the other. On the driving-shaft is mounted a stationary clutch, C, and the driven shaft carries a sliding clutch, D, fitted thereon by means of a feather-key, a, and so arranged that it can be thrown in and out of gear with the stationary clutch C. In the interior of this stationary clutch are formed a series of ratchet-teeth, b. If the driving-shaft is revolved in the right direction the stationary clutch C is compelled to revolve with it, and by throwing the sliding clutch in gear this motion is transmitted to the driven shaft B. But if the driving-shaft revolves in the wrong direction and the sliding clutch D is thrown in gear with the stationary clutch C the pawl c rides over the ratchet-teeth b and the clutch C remains stationary, so that no motion is transmitted to the shaft B.

This arrangement is of great value in all cases where the driven shaft is connected with some mechanism to which motion can be imparted only in one direction, and which, when moved in the wrong direction, will become injured or disarranged. The driving-shaft may receive its motion from any source—for instance, by belt and pulley from a steam-engine. If the engine is reversed while the two clutches are in gear the driven shaft B will remain stationary, and the mechanism connected thereto sustains no injury.

Or the driving-shaft may receive its motion from a wheel, which travels on the ground, the shaft B being connected thereto by the clutches C D, and serving to operate any mechanism which will become injured if said shaft should be caused to revolve in the wrong direction. If my mechanism is employed, the driving-wheel may be turned back at any moment without danger of producing any injury, and, furthermore, said wheel can be removed from the shaft and replaced without disturbing the clutch C, or without danger of losing the pawl and spring.

What I claim as new, and desire to secure by Letters Patent, is—

The combination of two shafts, A B, a stationary clutch, C, mounted on the driving-shaft A, a sliding clutch, D, mounted on the driven shaft B, a driving-wheel firmly secured to the shaft C, ratchet-teeth b, formed in the interior of the clutch C, and a spring-pawl, one or more, fitted into a socket formed for its reception in the driving-shaft A, and meshing into the ratchet-teeth b, all constructed and operating substantially as and for the purpose set forth.

In testimony that I claim the foregoing I have hereunto set my hand and seal this 22d day of February, 1877.

WALTER ADRIANCE. [L. S.]

Witnesses:
 ROBT. N. PALMER,
 WM. MCLEAN.